United States Patent [19]

McClure, III et al.

[11] 4,187,923
[45] Feb. 12, 1980

[54] GUIDE WHEEL POSITION INDICATING APPARATUS

[75] Inventors: Maxwell D. McClure, III; William D. Lester, both of Memphis, Tenn.; Robert M. Fachini, Naperville, Ill.

[73] Assignee: International Harvester Company, Chicago, Ill.

[21] Appl. No.: 896,865

[22] Filed: Apr. 17, 1978

[51] Int. Cl.² .............................................. B60Q 1/42
[52] U.S. Cl. ..................................... 180/215; 116/31; 200/61.31; 200/61.38; 340/52 R
[58] Field of Search ........................ 180/103 R, 1 AP; 116/31; 340/52 R, 686; 200/61.31, 61.32, 61.33, 61.35, 61.36, 61.37, 61.38

[56] References Cited

U.S. PATENT DOCUMENTS

| | | | |
|---|---|---|---|
| 1,582,069 | 4/1926 | Nanna | 200/61.33 |
| 2,407,934 | 9/1946 | Nilson | 200/61.33 |
| 2,934,035 | 4/1960 | Hardy | 116/31 |
| 2,957,442 | 10/1960 | Coon | 116/31 |
| 3,103,909 | 9/1963 | Anderson | 116/31 |
| 3,673,561 | 6/1972 | Bronstein | 340/52 R |
| 3,900,831 | 8/1975 | Houseman et al. | 340/52 R |

OTHER PUBLICATIONS

Operators Manual for John Deere #9900 Cotton Picker, #OM-N159377, Issue K4, p. 10, Controls.
Parts Catalog for John Deere 9900 Cotton Picker, PC-1457, pp. 5-1 & 60-5, (1974).

Primary Examiner—John A. Pekar
Assistant Examiner—Donn McGiehan
Attorney, Agent, or Firm—Dennis K. Sullivan; Neal C. Johnson; F. David AuBuchon

[57] ABSTRACT

A cotton harvester having a hydrostaticly steered rear guide wheel assembly is provided with a steering arm having a raised horizontal segment which moves with the guide wheel. When the guide wheel off center, the raised horizontal segment contacts one of a pair of contact arms and grounds an electric circuit from one of a pair of indicator lamps in the operator's compartment turning the lamp on and informing the operator of the direction in which the harvester will steer.

3 Claims, 4 Drawing Figures

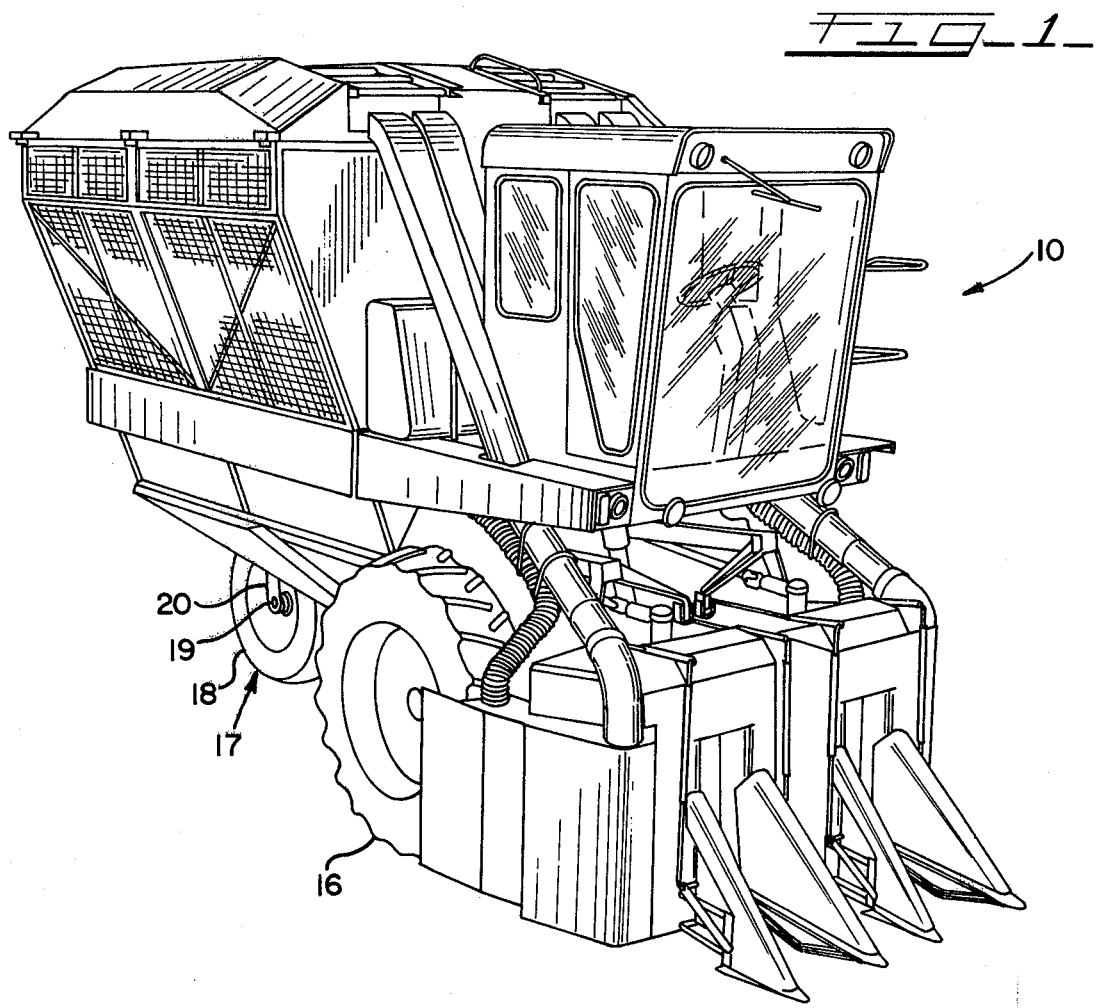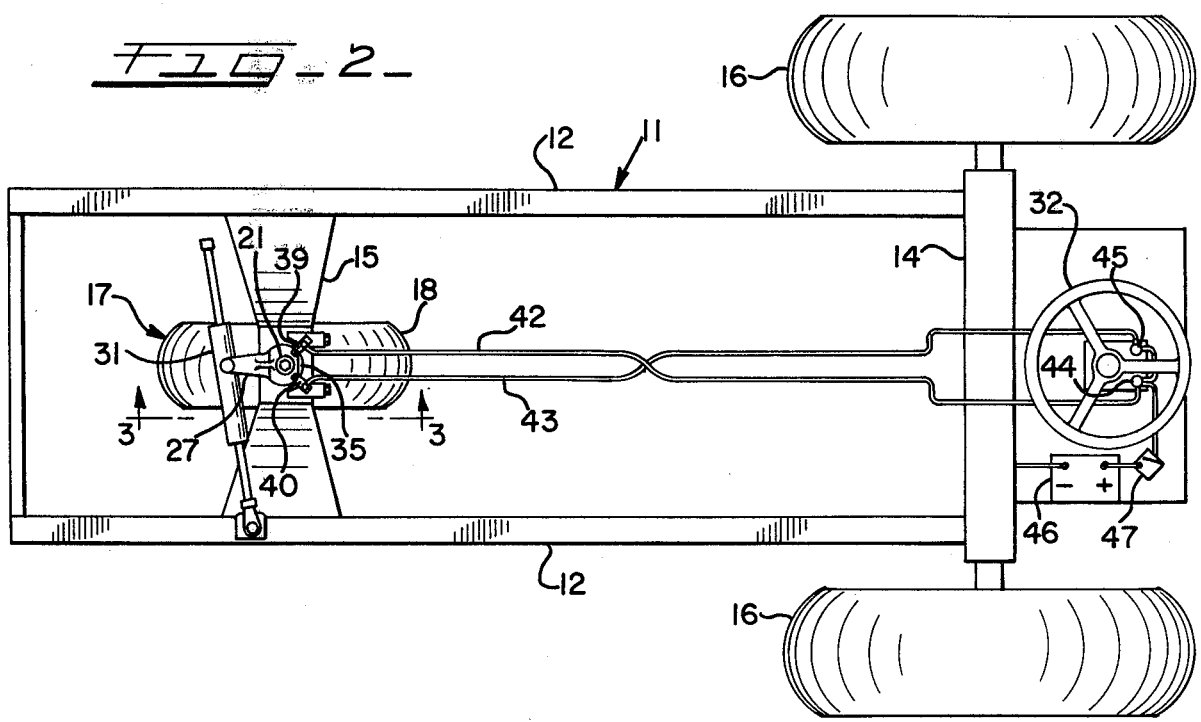

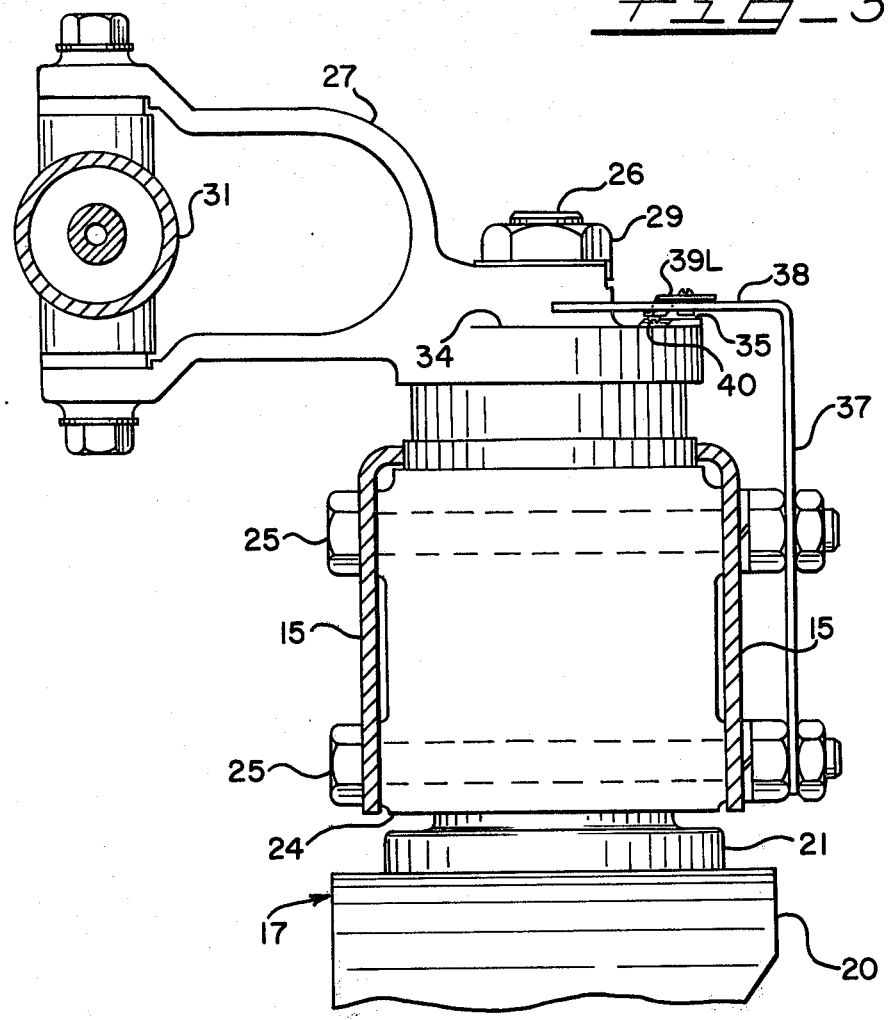
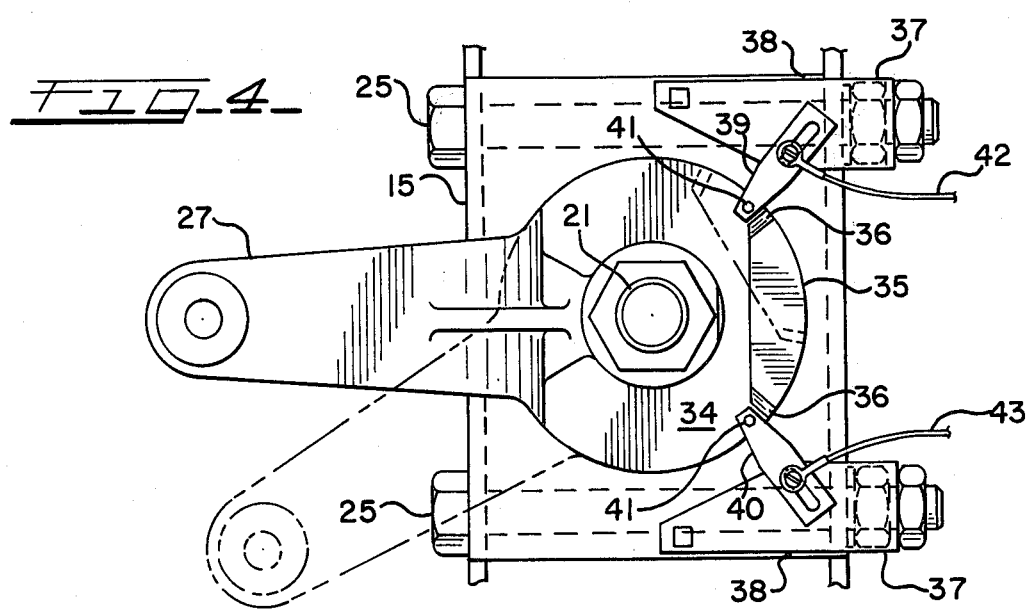

GUIDE WHEEL POSITION INDICATING APPARATUS

CROSS REFERENCE TO RELATED APPLICATION

This application is related to application, Ser. No. 853,352, Filed Nov. 21, 1977, by Robert M. Fachini and William D. Lester, and assigned to the assignee hereof.

BACKGROUND OF THE INVENTION AND THE PRIOR ART

This invention relates to the steering of vehicles, such as cotton harvesters, having forward main drive wheels and a rear steerable guide wheel controlled by a hydrostatic steering system and, more particularly, to apparatus therefor for indicating to the operator the guide wheel position relative to the direction of travel.

In a cotton harvester, especially one having a single rear steerable guide wheel, the operator is mounted forwardly above the main drive wheels to observe the harvesting operation and guide the harvester. In normal conditions, as the main drive wheels pull the harvester down the row, the steerable guide wheel adjusts and controls the direction of the harvester. However, in muddy, slick field conditions, the steerable rear wheel may skid and not steer the harvester, leaving the operator to use his individual brakes on the main wheels to maintain the direction of the harvester. With the conventional hydrostatic steering, the wheel may become turned out of fore-and-aft alignment without the operator even being aware of it. Besides causing greater power consumption, an off center position of a skidding wheel could also cauuse an unexpected turn should the wheel encounter dry ground. Another problem is that cotton harvesters are provided with side dumping baskets and when they are pulled alongside a trailer to dump the basket, the steerable guide wheel may become turned, so that upon pulling away from the trailer, the rear end of the harvester swings into the trailer causing damage.

Others have provided various devices for mechanically indicating the position of the steerable wheels in automobiles based on the position of the steering wheel. See, for example, U.S. Pat. Nos. 2,934,035 to Hardy and 3,103,909 to Anderson. Coon U.S. Pat. No. 2,957,442 additionally illustrates an electrical system for doing the same. These systems measure the position of the steering wheel shaft and are not applicable to vehicles such as cotton harvesters having hydrostatic steering systems wherein there is no mechanical connection between the steering wheel shaft and the steerable guide wheel. Still others have provided a cotton picker with an electrical circuit to indicate whether the guide wheel is in fore-and-aft alignment with the line of travel. The latter system does not indicate the direction in which the steerable guide wheel will steer the cotton harvester. Moreover, the electrical circuit thereof includes a push button switch externally mounted to the frame adjacent the guide wheel assembly, the switch being mechanically actuated by a cam means mounted on the guide wheel. The external environment of a cotton harvester often includes cold, wet, and muddy conditions as well as a considerable amount of vibration and high amplitude movement caused by the cotton harvester encountering the extreme variations in the ground surface present in agricultural fields. Besides the additional costs, an external switch would be less reliable under these conditions.

SUMMARY OF THE INVENTION

Accordingly, it is an object of the invention described and claimed herein to provide a guide wheel position indicating apparatus for a cotton harvester having a hydrostatic steering system wherein the direction in which the guide wheel will steer the harvester is disclosed as well as the fact that it is out of fore-and-aft alignment.

A further object of the invention is to provide said guide wheel indicating apparatus with electric circuitry wherein no external switches are employed but merely grounding contacts.

These and other objects of the invention are specifically met in a cotton harvester having a hydrostatically steered rear wheel assembly rotatably mounted by a vertical pivot shaft to a transverse frame member. Above the frame member, the pivot shaft is provided with a steering arm having a raised horizontal segmental portion. A pair of contact arms, electrically insulated from the frame, are mounted thereto in such a position that when the steerable wheel is in fore-and-aft alignment, no contact is made by the raised horizontal segment of the steering arm with either of the contact arms, but when the steerable wheel is out of alignment in a given direction, the contact arm on that side will contact the raised portion of the steering arm. Each of the contact arms is provided respectively with a ground lead extending from a lamp in the operator's compartment, the lamp being connected to the vehicle battery. Thus, when the steerable wheel is off center, the contact between the raised portion of the steering arm and one of the contact arms grounds the circuit through the steering axle, thereby lighting the respective lamp and indicating to the operator the direction in which the wheel will steer the harvester.

DESCRIPTION OF THE DRAWINGS

Other objects and advantages of the invention will become apparent upon reading the following detailed description and upon reference to the drawings, in which:

FIG. 1 is a perspective view of a cotton harvester employing the present invention;

FIG. 2 is a schematic plan view of the frame and wheels of the cotton harvester of FIG. 1, the electrical circuitry of the guide wheel indicating system being illustrated schematically thereon;

FIG. 3 is a partial sectional view of the mounting of the steerable rear guide wheel assembly to the frame of the cotton harvester of FIG. 1; and FIG. 4 is an enlarged plan view of a portion of FIG. 2 illustrating the steering arm mounting to the frame and a portion of the present invention.

DETAILED DESCRIPTION OF THE INVENTION

Turning to the drawings, there is shown a cotton harvester generally designated 10, such as a cotton picker, including a main frame structure 11 having left and right fore-and-aft extending side rails 12 which are interconnected near the front of the vehicle by a transverse beam 14 and near the rear of the vehicle by transverse bolster beam 15 to form an integral frame structure. Supporting the front end of the frame 11 are a pair of fixed position parallel main drive wheels 16 spaced outwardly of the frame 11, the drive wheels 16 being driven in any suitable manner.

A steerable rear guide wheel assembly generally designated 17, is pivotally mounted on a vertical axis to the transverse bolster beam 15 along the longitudinal center line of the cotton harvester 10. The steerable guide wheel assembly 17 comprises a guide wheel 18 rotatably mounted on a horizontal axle 19, the respective ends of which are attached to the bifurcated lower ends (one side shown in FIG. 1) of a vertically extending yoke 20. Fixedly mounted to and extending upwardly from the yoke 20 is a vertical pivot shaft 21 bearing mounted in a support casting 24, the support casting 24 sliding into the center of the transverse bolster beam 15 and being retained therein by bolt assemblies 25. Thus, the pivot shaft 21 is held rigidly in a right angle position to the bolster beam 15 so that the rear guide wheel 18 supports the frame 11 while being able to turn about a transversely central vertical axis. The pivot shaft 21 protrudes upwardly beyond the top of the bolster beam 15 to an end 26 on which a steering arm 27 is mounted for rotation therewith as by splines and is retained thereon by a nut 29. The actuating arm 27 extends radially outwardly from its connection with the pivot shaft 21 to a distal end formed as a yoke in which the housing of a double rodded, double acting hydraulic steering cylinder assembly 31 is pivotally mounted, one end of the steering cylinder rod being pivotally attached to the frame side rail 12 as shown in FIG. 2. The steering cylinder 31 is connected to and actuated by a hydrostatic pump which is operated by the steering wheel 32 in the operator's compartment. For a more complete discussion of the specific hydrostatic steering system used herein, which does not form part of the present invention, reference should be made to the aforementioned related application Ser. No. 853,352.

In accordance with the invention, the portion of the steering arm 27 diametrically opposite the connection of the cylinder 31 is provided with a radially extending surface 34 having an axially upwardly raised segmental portion 35 subtending an arc of about 75 degrees. The ends 36 of the raised portion 35 are provided with ramps angling down to the surface 34. A pair of brackets 37 are mounted to the transverse bolster beam 15 respectively to the left and right of the pivot shaft 21 as by attachment to the ends of the bolts 25. The brackets 37 extend upwardly to horizontal portions 38 extending rearwardly at a level slightly above the raised portion 35 of the steering arm 27. Attached to the horizontal portion 38 of each of the brackets 37 but electrically insulated therefrom as by felt washers on either side thereof are left and right contact arms 39 and 40, each made of spring steel and having a round headed machine screw attached to the end thereof with the head downward forming a contact tip portion 41 of small surface area. In a non-biasing position, the contact arm maintains the head of the screw 41 at a level below the raised segmental portion 35 but above the radial surface 34 of the steering arm 27. As can best be seen in FIG. 4, when the guide wheel 18 is in fore-and-aft alignment with the center line of the harvester, neither of the contact tip portions 41 of the contact arms 39, 40 are in contact with the raised portion 35 of the steering arm but are radially offset therefrom an equal amount in each direction. As may be seen from the drawing, the amount that the contact tip portions 41 are circumferentially offset from the raised portion 35 of the steering arm 27 will determine the amount of play available to the guide wheel 18 before an indication is made to the operator. While five degrees on either side is believed to be adequate for this purpose, the contact arms 39, 40 are slotted to permit the contact tip portions 41 thereof to be located considerably further from the raised portion 35, enough that the indicator would light only when the wheel was at the maximum steering position permitted by the cylinder 31. Electrical ground leads 42, 43 are connected respectively to the contact arms 39 and 40 as by the screws holding the contact arms to the bracket 38, but are electrically insulated from bracket 38. The ground lead 42 extending from the left contact arm 39 is connected to one side of a right lamp 44 mounted in the operator's compartment adjacent the steering wheel 32. The other side of the right lamp 44 is wired in parallel with the left lamp 45, which is similarly connected by ground lead 43 to the right contact arm 40, and both are connected to the negatively grounded vehicle battery 46 through an ignition switch 47. The reason for the ground leads 42, 43 crossing from the one side to the other will be apparent immediately hereinafter.

In operation, with the ignition switch 47 turned on, as the harvester moves forward with the rear steerable guide wheel 18 being in fore-and-aft alignment, no contact is made between the raised portion 35 of the steering arm 27 and either of the contact arms 39 or 40 and thus, neither of the lamps 44 or 45 are lit. When the steering wheel 32 is turned to the right, the hydraulic cylinder 31 moves the steering arm 27 to the right which moves the forward portion of the wheel 18 to the left thereby causing the harvester 10 to steer to the right. The raised portion 35 of the steering arm comes into contact with the contact arm 39, as shown in phantom is FIG. 4, grounding the ground lead 42 to the frame 11 through the steering arm 27 and causing the right lamp 44 to light and indicating to the operator that the steerable wheel 18 is positioned to steer the harvester to the right. Similarly, if the steering wheel 32 is turned to the left, the steering arm 27 will be turned to the left thus bringing the raised portion 35 thereof in contact with the right contact arm 40 grounding the circuit to the left lamp 45 and lighting it.

Thus, it has been seen that there has been provide in accordance with the invention a guide wheel indicating system for a cotton harvester which fully satisfies the objects, aims and advantages set forth above and is apparent that those with ordinary skill in the art will recognize various modifications of the invention in the light of the foregoing specification. It is intended to cover those modifications falling within the scope of the appended claims.

What is claimed is:

1. In a cotton harvester having a main frame including a rearwardly located transversely extending bolster beam integral therewith, a forwardly located operator's compartment mounted on said frame, including a steering wheel, a pair of laterally spaced front driving wheels supporting the forward portion of said main frame, a rear steerable guide wheel having a vertical pivot shaft pivotally mounted to said bolster beam near the transverse center thereof, and hydrostatic steering means for controlling the relative position of said guide wheel assembly relative to the line of travel of said cotton harvester, the position of said guide wheel assembly being mechanically independent of that of said steering wheel, the improvement comprising a member mounted against rotation on said vertical pivot shaft above said bolster beam, said member including a horizontal segmental portion axially displaced from but in electrical contact with the adjacent structure of said member, first and second contact arms mounted to but electrically insulated from said frame, said arms having contact tip portions located respectively adjacent the circumferential ends of said segmental portion such that upon said steerable guide wheel being in fore-and aft alignment with said line of travel, no contact is made between either of said contact arms and said segmental portion, and upon said steerable guide wheel being turned a predetermined amount out of fore-and-aft alignment, said segmental portion contacts only one of said first and second contact arms, and first and second lamps mounted at said operator's station and being electrically connected respectively independently to said first and second contact arms, said lamps further being electrically connected to a frame grounded vehicle battery located on said vehicle in such a manner that upon said steerable wheel being turned said predetermined amount out of fore-and-aft alignment and contacting one of said contacting one of said contact arms, the electrical circuit from the lamp associated with said one contact arm will become grounded through said pivot shaft to said frame whereby said lamp will be lit to indicate the direction in which said harvester will steer.

2. The invention in accordance with claim 1 and said member comprising a steering arm actuated by said steering means, said segmental portion comprising an integral axially raised boss thereon.

3. The invention in accordance with claim 2 and said contact arms being mounted with sufficient adjustment that said predetermined amount that said wheel may turn prior to contact may be substantially varied.

* * * * *